Oct. 3, 1933.    H. E. McCRERY    1,928,670
DUST REMOVER
Filed June 28, 1932    8 Sheets-Sheet 2

INVENTOR
Harold E. McCrery
by Byrnes, Stebbins, Parmelee & Blenko
His Attys.

Oct. 3, 1933.    H. E. McCRERY    1,928,670
DUST REMOVER
Filed June 28, 1932    8 Sheets-Sheet 4

INVENTOR
Harold E. McCrery
by Byrnes, Stebbins,
Parmelee & Blenko,
His Attys.

Oct. 3, 1933.    H. E. McCRERY    1,928,670
DUST REMOVER
Filed June 28, 1932    8 Sheets-Sheet 6

INVENTOR
Harold E. McCrery

Oct. 3, 1933.  H. E. McCRERY  1,928,670
DUST REMOVER
Filed June 28, 1932   8 Sheets-Sheet 7

INVENTOR
Harold E. McCrery

Patented Oct. 3, 1933

1,928,670

UNITED STATES PATENT OFFICE 1,928,670

DUST REMOVER

Harold E. McCrery, Pittsburgh, Pa., assignor to Blaw-Knox Company, Blawnox, Pa., a corporation of New Jersey Application June 28, 1932. Serial No. 619,700

33 Claims. (Cl. 183—59)

This invention relates to dust removers for filtering the dust from air or other gases.

In the accompanying drawings, which illustrate the present preferred embodiment of my invention.

Figure 1:
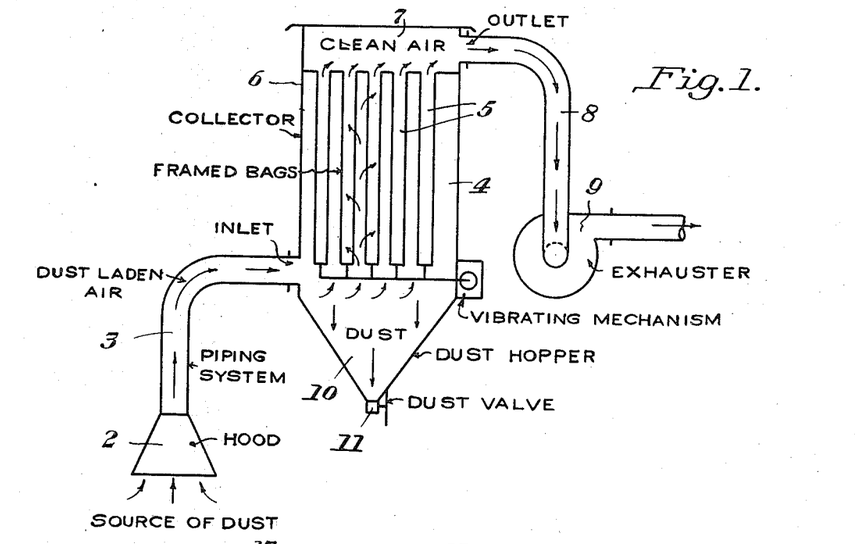
Figure 1 is a diagrammatic illustration of the apparatus.

Referring more particularly to the accompanying drawings, Figure 1 illustrates diagrammatically the manner in which dust is separated from the air in accordance with the present invention. The dust laden air or gas is delivered through a hood 2 and pipe 3 to a chamber 4, in which are located a plurality of separators 5. The housing 6 of the dust collector is divided by the seals of the separators, as will be more fully described hereinafter, into the chamber 4 which receives the dust laden air, and a clean air chamber 7 into which the clean air from which the dust has been filtered passes. The clean air is delivered from the chamber 7 through a pipe 8 by an exhauster 9. The separators 5 are made of cloth or wire screen, depending upon the type of dust which it is desired to separate, and in the preferred form are bag shaped which are open at the top, but are closed on the sides, ends and bottom. The dust collects on the outside of the separators, the clean air passing through the separators into the clean air chamber 7. Means hereinafter described is provided for vibrating the separators and beating them so as to dislodge the dust which collects on the outside thereof, and this dust is collected in a dust hopper 10 from which it may be delivered through a valve 11.

Figure 2:
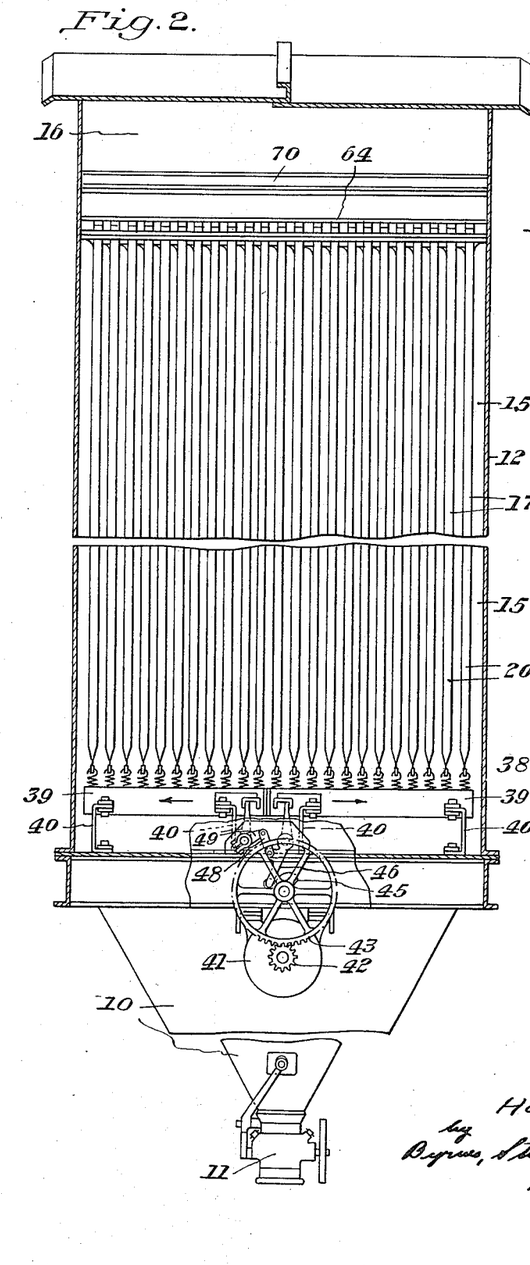
Figure 2 is a broken vertical section illustrating the arrangement of separators used for separating the dust from the air, and also the means for vibrating the separators.
Figure 3:
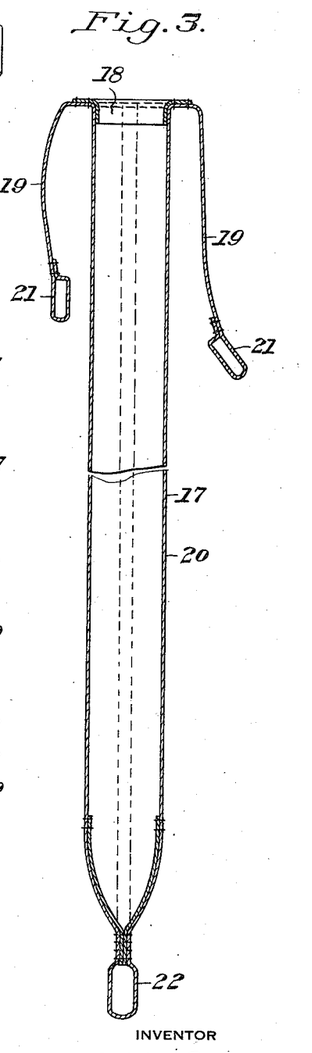
Figure 3 is a broken vertical section of one of the separators.
Figure 10:
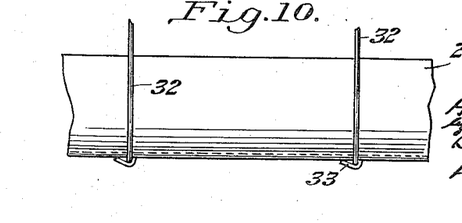
Figure 10 is a front elevation of a portion of the bottom member of the frame shown in Figure 6.

The actual construction of a preferred embodiment of the invention is illustrated in the other figures. Referring more particularly to Figures 2 to 10, the dust collector comprises a housing 12 having an inlet 13 and an outlet 14, the interior of the housing being divided into a dust chamber 15 and a clean air chamber 16. As shown in Figure 2, a plurality of separators 17 are located within the housing. One of these separators is illustrated in detail in Figure 3. The separators are bag shaped, having an open top 18, but being closed at their sides, ends and bottom. The top of each bag is provided with flanges 19 which extend beyond the sides and ends of the body 20 of the separator. The lower end of each of the flanges 19 is formed in a loop 21 into which a wrapping rod may be inserted, as will be described more fully hereinafter. The bottom of the separator is formed in a loop 22 adapted to receive a spring tension rod 53 used for connecting the bottoms of the separators to shaker frames which vibrate the separators in order to remove dust therefrom. The separators 17 are mounted on frames indicated generally by the reference numeral 25 and shown in detail in Figures 6 to 10, inclusive. These frames are of metallic construction, each frame comprising a top 26, a bottom 27, two side plates 28, reinforcing members 29 at the corners, and trough-shaped cross members 30. The cross members 30 are provided with openings 31 which allow the air from which the dust has been filtered to pass upwardly through the interior of the separators into the clean air chamber 16. The separators are slipped up around the frames 25 and are supported by the sides, top and bottom, and cross members 30 of the frames. In order to give more support to the separators and also in order to impart further vibration thereto, wires 32 are wound around the top and bottom members of the frame. The wires are prevented from being displaced laterally by clips 33 formed by stamping out and bending back a portion of the bottom member 27, as shown in Figure 10. At the top of the frame the end of each wire is formed in a loop and the ends are secured together by placing a nail in the loops and twisting it. It will be understood that the inside separator frame and wires are on the inside of the separators, acting to support the separators and preventing them from collapsing due to the action of the exhauster which draws the air through the system.

Figures 6, 7, 8:
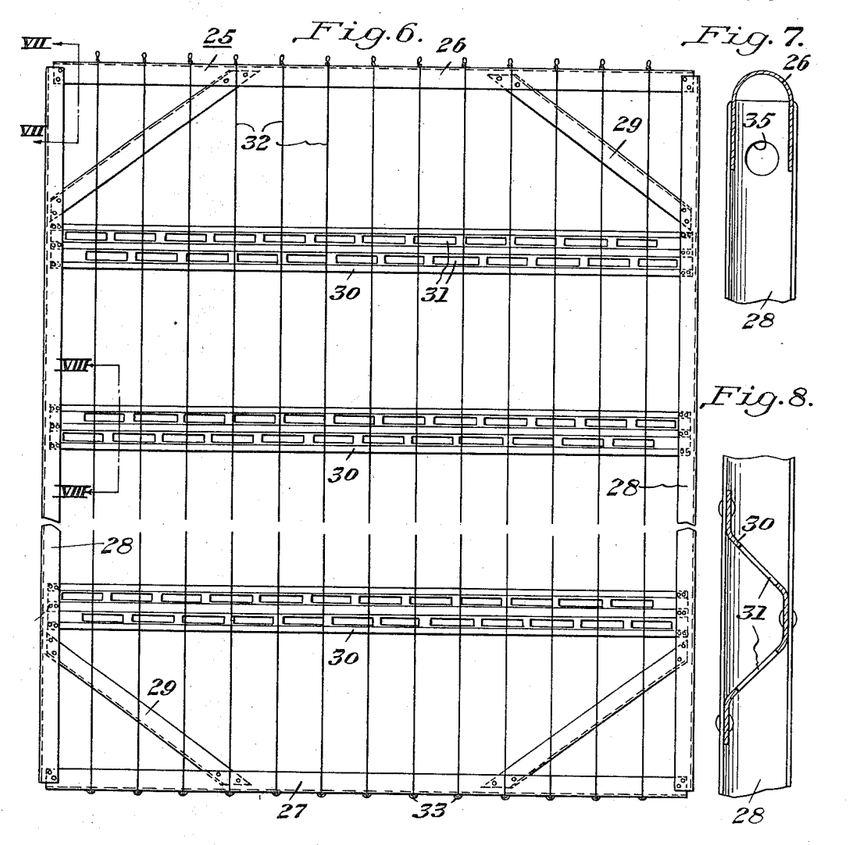
Figure 6 is a broken front elevation of a separator frame used for preventing collapse of the separators when in use.
Figures 7 and 8 are enlarged sectional views taken on the lines VII—VII and VIII—VIII, respectively, of Figure 6.
Figure 9:
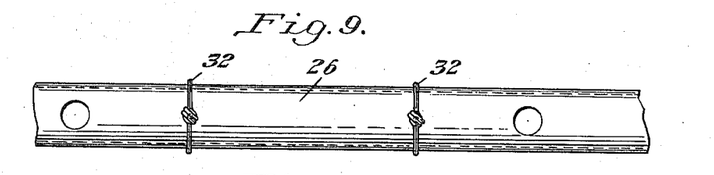
Figure 9 is a plan view of a portion of the top member of the separator frame shown in Figure 6.
Figure 16:
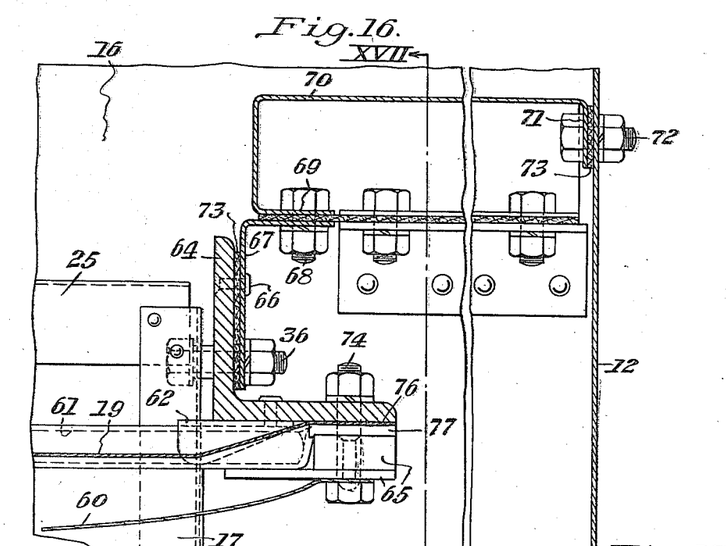
Figures 16, 17 and 18 are detail sectional views illustrating the manner in which the separators form the air seal, Figure 16 being a section on the line XVI—XVI of Figure 15, Figure 17 being a section on the line XVII—XVII of Figure 16, and Figure 18 being a section on the line XVIII—XVIII of Figure 15.

The frames 25 are pivoted adjacent their tops so that they may be vibrated back and forth in order to dislodge dust. Each of the side members 28 shown in Figure 7 is provided with an opening 35 for receiving a bolt 36 which is mounted, as shown in Figure 16, in an angle 64 which is supported from the side of the housing.

Figure 4:
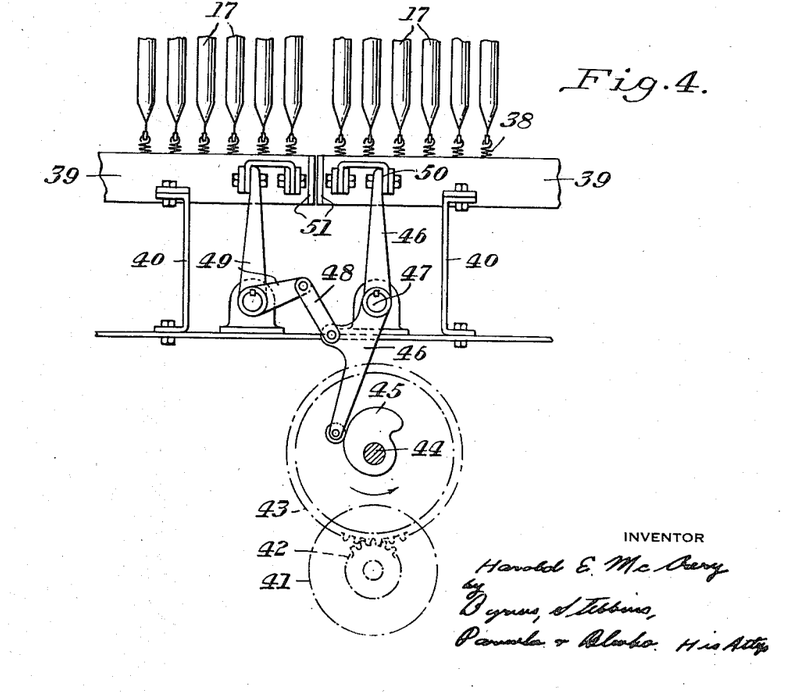
Figure 4 is a partial elevation of the lower end of the dust collector illustrating the attachment of the lower ends of the separators to shaking frames, and also illustrating the method of vibrating the frames.
Figure 15:
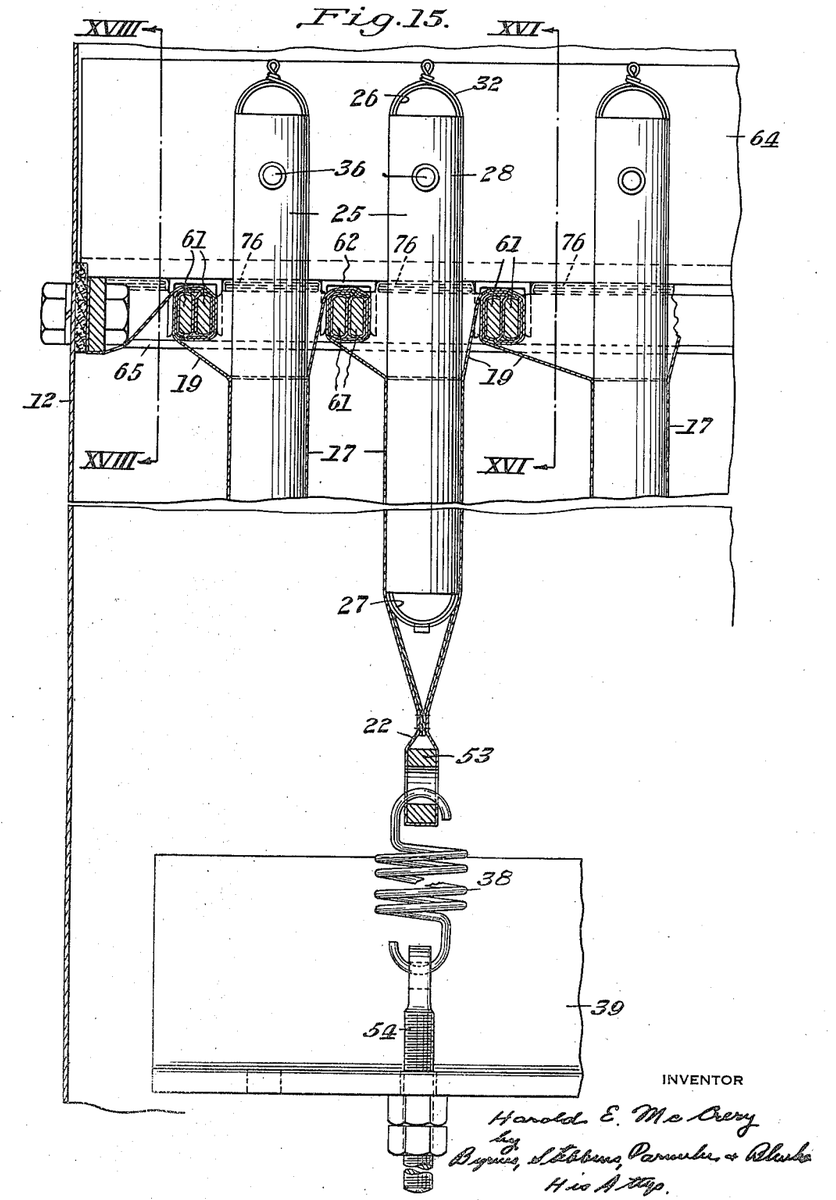
Figure 15 is a view similar to Figure 13 but illustrating the separators after the flanges of the separators have been wound to form the seal.

Referring to Figures 2, 4, 5 and 15, the bottoms of the separators are connected by springs 38 to shaker frames 39. There are two of these shaker frames 39 at each side of the housing, as shown in Figure 4, a plurality of separators being connected at each end to each of the frames. The shaker frames are connected to the housing by resilient straps 40. Movement is imparted to the shaker frames 39 so as to move them apart and then bring them together in order to bump them, thereby dislodging the dust from the outside of the separators and causing it to fall into the dust hopper. The vibration of the shaker frames 39 is accomplished by a motor 41 having a gear 42 meshing with a gear 43. The gear 43 is secured to a shaft 44 and also connected to this shaft is a cam 45. As the cam 45 rotates, it moves a bell crank lever 46 which is pivoted at 47 and also, through means of a link 48, it moves a bell crank lever 49. The upper end of the lever 46 is connected at 50 to one of the shaker frames 39 and the lever 49 is connected at its upper end to the other shaker frame. It will be seen that as the cam 45 is rotated, it moves the shaker frames apart and then together so as to bump them, bumpers 51 being provided in order to take the shock, thereby dislodging the dust from the outside of the separators. The connection between the bottoms of the separators and the shaker frames is made by passing one end of the spring 38 through a spring tension rod 53 which is held in the loop 22, as shown in Figure 15. The lower end of the spring 38 passes through an eye-bolt 54 secured to the shaker frame 39.

Figure 5:
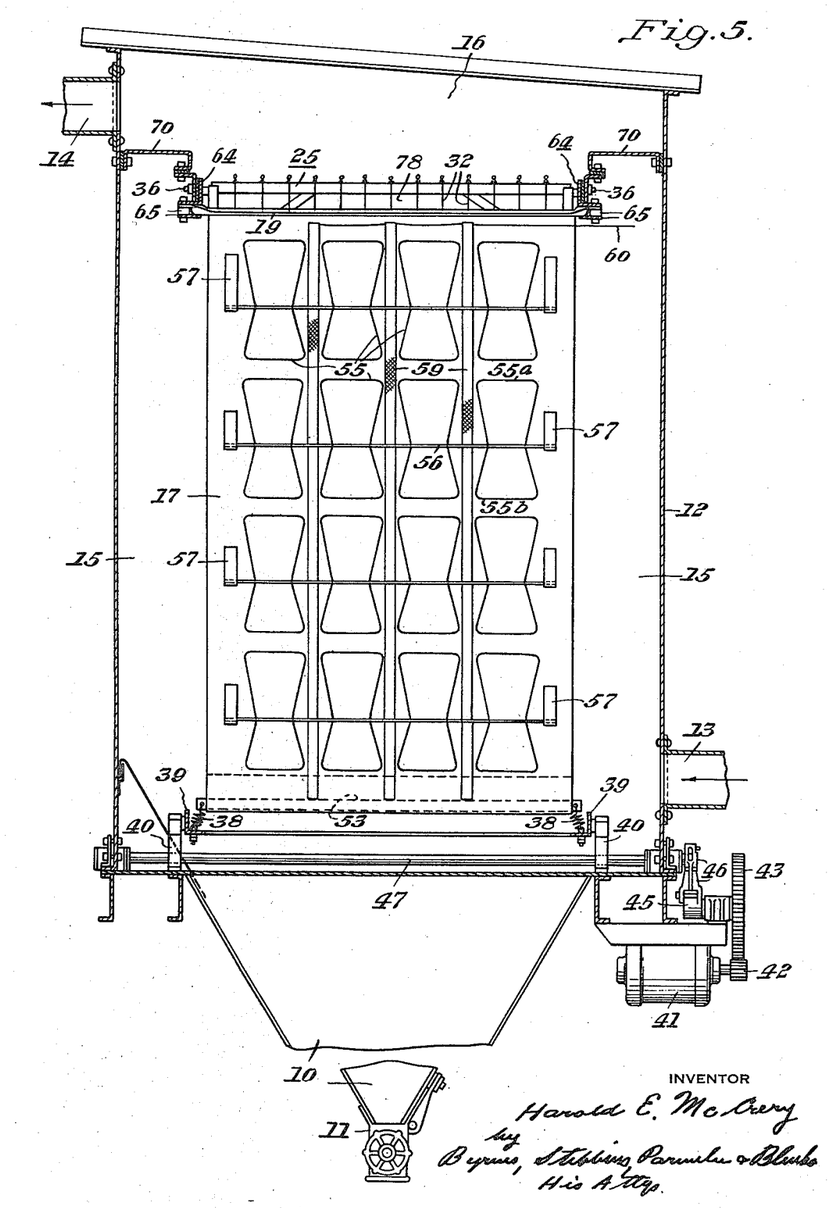
Figure 5 is a vertical section through the housing of the dust collector illustrating the beaters which are suspended from the outside of the separators and which act to beat the dust from the separators.
Figures 11, 12:
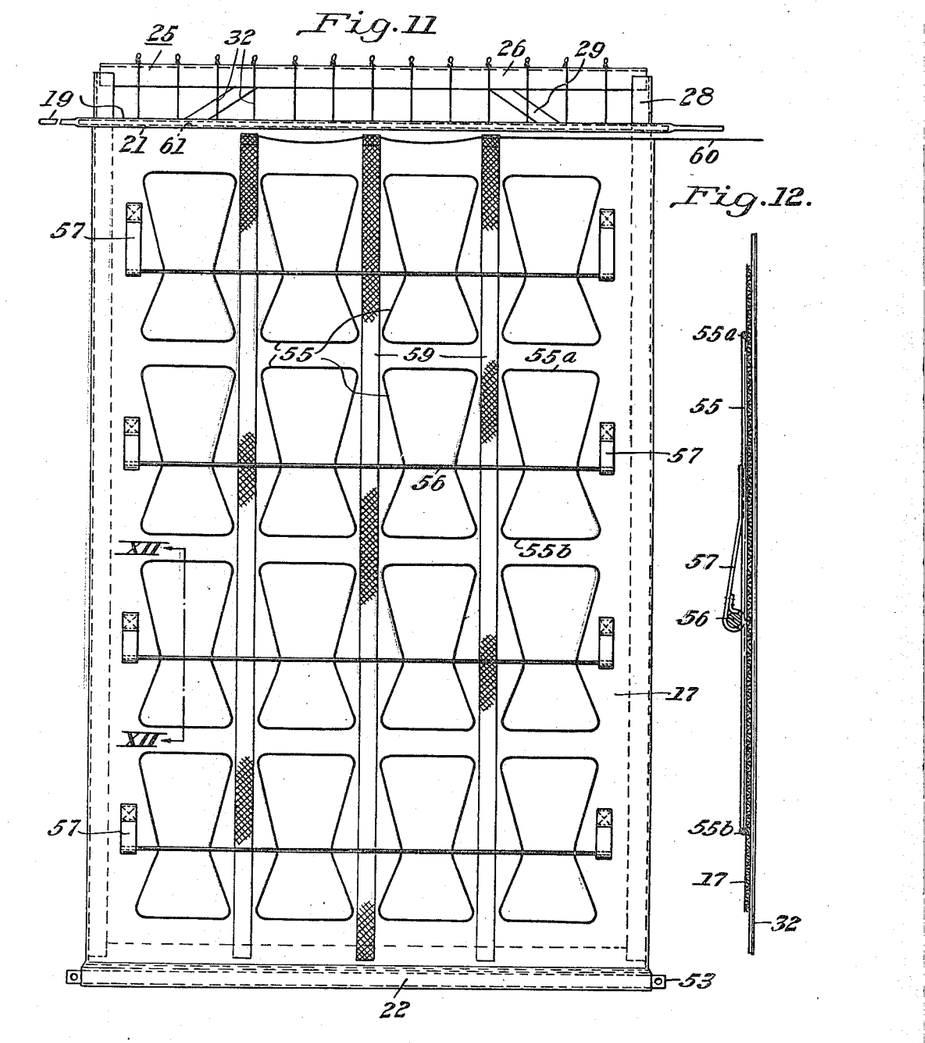
Figure 11 is a front elevation of a separator and beaters removed from the housing of the dust collector.
Figure 12 is an enlarged section taken on the line XII—XII of Figure 11.

Beaters are provided for dislodging the dust from the outside of the separators. The construction and arrangement of the beaters is illustrated in Figures 5, 11 and 12. The beaters 55 are formed of wire bent to the shape indicated, a number of beaters being secured to each of a plurality of beater rods 56 which extend across the outside of the separators and are suspended by straps 57 secured to the separators.

The beaters and beater rods are thus suspended freely by the straps and are free to beat against the sides of adjacent separators as the separators are vibrated. The upper loops 55a of the beaters are longer than the lower loops 55b, it having been found that a more efficient beating action is accomplished when the loops are made unsymmetrical. Furthermore, the length of the straps 57 at the upper portion of the separator is greater than that at the lower end of the separator, the length of the straps decreasing from the top to the bottom of the separator. The vibration of the tops of the separators is, of course, less than the bottoms, and in order to compensate for this difference in length of vibration, the unsymmetrical arrangement of the loops of the beaters and the difference in length in the straps 57 has been resorted to. The separators are provided with wire mesh strips 59 to which is connected a ground wire 60, the wire mesh and ground wire acting to discharge electrostatic charges formed on the screen, thereby reducing fire hazards. As the separators are vibrated back and forth, the beaters strike first against one of the separators and then against an adjacent separator, one set of beaters thereby acting to dislodge the dust from the sides of two separators.

Figure 13:
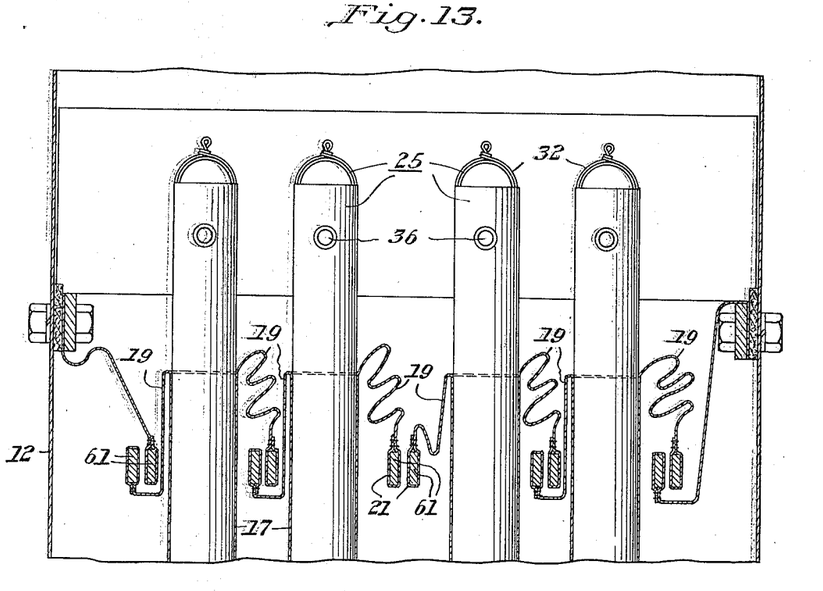
Figure 13 is a vertical section taken in a plane at right angles to the sides of the separators and illustrating the separators just prior to forming the seal between adjacent separators.
Figure 14:
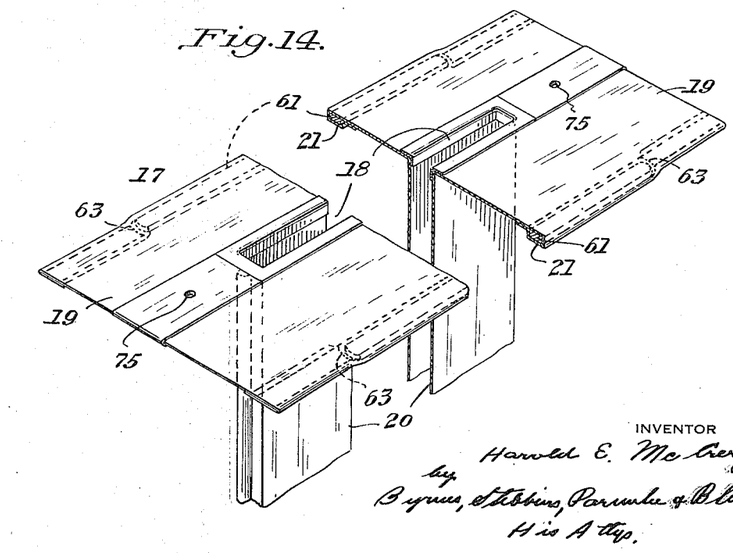
Figure 14 is a broken perspective view of one of the separators.
Figure 17:
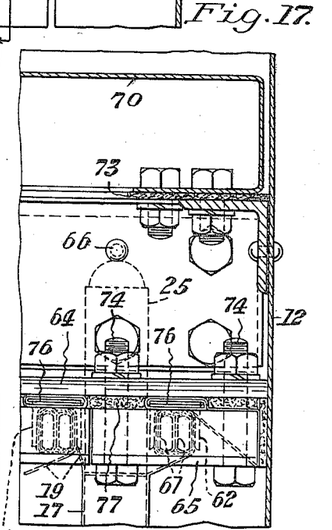
Figure 18:
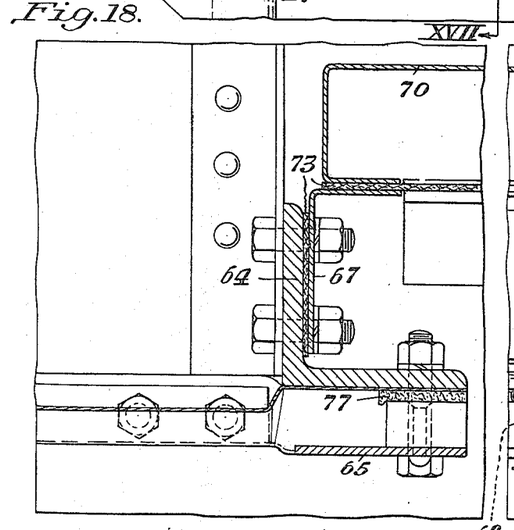

It has been stated previously that the top flanges 19 of the separators are used to form an air seal which divides the housing 12 into a dust chamber 15 and a clean air chamber 16. The manner in which this seal is made is illustrated in Figures 5 and 13 to 18, inclusive. The separator 17 shown in Figure 14 is bag shaped, having an open end 18 but otherwise closed. The seal between the sides of adjacent separators is made by inserting a wrapping rod 61 into each of the loops 21 formed in the flanges 19 and then wrapping the flanges of adjacent separators around the rods. In Figure 13, the rods 61 are shown inserted in the loops 21 preparatory to wrapping the flanges around the rods in order to form the seal. The seal is made by placing the rods 61 of two adjacent separators together and then wrapping the flanges around the rods. After the rods have been wrapped, clips 62 are placed on the ends of each set of two rods and the ends of the rods are placed between clamps supported from the housing, as shown in Figures 16 and 17. It is to be noted that the rods 61 are of less length than the flanges 19. The rods are inserted into the loops 21 and are secured in position by sewing the loops as indicated at 63. The clamp for the ends of the wrapped rods and also for the wrapped ends of the flanges 19 which extend beyond the ends of the rods 61, is formed by angles 64 and clamping elements 65. One of these angles 64 extends along each side of the housing and is secured by rivets 66 to an angle 67. Each angle 67 is secured by bolts 68 to a flange 69 of a channel 70 having a flange 71 secured by bolts 72 to the side of the housing 12. Packing 73 is placed between these elements in order to prevent leakage of air. The ends of the wrapping rods 61 rest on the clamping elements 65 and are secured between the clamping elements and the undersurface of the angle 64 by means of bolts 74. The wrapped ends of the flanges 19 which extend beyond the ends of the wrapping rods are placed between the angle 64 and the clamping element 65 and are secured by the bolts 74 which pass through holes 75 formed adjacent the outer edge of each of the flanges 19. The wrapped ends of the flanges 19 which extend beyond the ends of the wrapping rods 61 are indicated in Figures 16 and 17 by the reference numeral 76. The space between the ends 76 of each set of separators is filled with packing 77 so as to provide an air-tight seal. It will be seen from the above description that the space between adjacent separators is sealed by wrapping the flanges 19 around the wrapping rods 61. The spaces at the sides of the housing between the angles 64 and the ends of the separators are sealed by clamping the wrapped ends 76 of the separator flanges 19 between the angles 64 and the clamping elements 65. A worn separator may be replaced by a new one by releasing the springs 38 at the bottom of the bag, loosening the bolts 74 at the top, unwrapping the seal, dropping the used bag so as to remove it from its supporting frame, and then pulling up a new bag around the frame, sealing it in position and attaching the springs to the shaker frame. The whole operation may be carried out in a few minutes, as contrasted with the many operations necessary where the seal is made by the usual fastening means, such as tacks or screws.

Instead of using an exhauster on the clean air side of the dust remover, a fan may be used on the dust laden side of the apparatus and the dust laden air may be forced through the apparatus rather than sucked through by the exhauster. Instead of fully forming the separator into the form of a bag and then slipping it up over the separator frame, the material forming the separator may be assembled on the frame and then clamped or otherwise secured at the sides and bottom.

As shown particularly in Figure 5, the separator frame 25 extends above the tops of the separators, thereby providing a free space 78 for the escape of the cleaned air from the space within the separator to the clean air chamber 16, the space 78 being unobstructed by the separator and being beneath the top member of the separator frame. This arrangement also makes it easy to tighten the wires 32 at the top of the separator frame without removing the separator from the frame.

I have illustrated and described the present preferred embodiment of my invention. It is to be understood, however, that the invention may be otherwise embodied within the scope of the following claims.

I claim:

1. Apparatus for separating dust from gas, comprising a housing, a plurality of separators in the housing, the separators being supported on pivoted swinging frames, means for sealing the space between adjacent separators, and means for sealing the space between the ends of the separators and the housing, whereby the space within the housing is divided into a dust chamber and a clean gas chamber.

2. Apparatus for separating dust from gas, comprising a housing, a plurality of substantially vertical separator frames spaced from each other at the top and bottom in the housing and pivotally supported adjacent their upper ends for swinging movement, separators on the frames, portions of adjacent separators being wrapped together to seal the space between adjacent separators, and an air seal between the ends of the separators and the housing.

3. Apparatus for separating dust from gas, comprising a housing, a plurality of substantially vertical separator frames spaced from each other at the top and bottom in the housing and pivotally supported adjacent their upper ends, separators on the frames, portions of adjacent separators being wrapped together to seal the space between adjacent separators and the space between the ends of the separators and the housing.

4. Apparatus for separating dust from gas, comprising a housing, a plurality of substantially vertical separator frames spaced from each other at the top and bottom in the housing and pivotally supported adjacent their upper ends, separators on the frames, and a wrapped separator seal sealing the space between adjacent separators.

5. Apparatus for separating dust from gas, comprising a housing, a plurality of substantially vertical separator frames spaced from each other in the housing and pivotally supported adjacent their upper ends, separators on the frames, the spaces between adjacent separators and between the ends of the separators and the housing being sealed by portions of the separators, the separators being supported by but unconnected to the frames.

6. Apparatus for separating dust from gas, comprising a housing, a plurality of substantially vertical separator frames spaced from each other at the top and bottom in the housing and pivotally supported adjacent their upper ends, separators on the frames, the spaces between adjacent separators and between the ends of the separators and the housing being sealed by portions of the separators, the seals being independent of the frames.

7. Apparatus for separating dust from gas, comprising a housing, a plurality of substantially vertical separator frames spaced from each other in the housing and pivotally supported adjacent their upper ends, separators on the frames, each of the separators having a flange adjacent the top, means for securing a wrapping rod in the flange, the separator being closed except at the top, the flanges of adjacent separators being wrapped together around the wrapping rods to seal the space between adjacent separators.

8. Apparatus for separating dust from gas, comprising a housing, a plurality of substantially vertical separator frames spaced from each other in the housing and pivotally supported adjacent their upper ends, separators on the frames, each of the separators having a flange adjacent the top, means for securing a wrapping rod in the flange, the separator being closed except at the top, the flanges of adjacent separators being wrapped together around the wrapping rods to seal the space between adjacent separators, the ends of the separator flanges beyond the wrapping rods being clamped by means supported by the housing in order to form a seal between the ends of the separators and the housing.

9. Apparatus for separating dust from gas, comprising a housing, a plurality of substantially vertical separator frames spaced from each other in the housing and pivotally supported adjacent their upper ends, separators on the frames, each of the separators having a flange adjacent the top, means for securing a wrapping rod in the flange, the separator being closed except at the top, the flanges of adjacent separators being wrapped together around the wrapping rods to seal the space between adjacent separators, the ends of the separator flanges beyond the wrapping rods being clamped by means supported by the housing in order to form a seal between the ends of the separators and the housing, the ends of the wrapped rods being supported from the housing.

10. Apparatus for separating dust from gas, comprising a housing, a plurality of substantially vertical separator frames spaced from each other in the housing, a bracket secured to each side of the housing, said frames being pivoted adjacent their upper ends to said brackets, separators on the frames, each of the separators having a flange adjacent the top, means for securing a wrapping rod in the flange, the separators being closed except at the top, the flanges of adjacent separators being wrapped together around the wrapping rods to seal the space between adjacent separators, clamps cooperating with said brackets, the ends of the wrapped rods being supported by said clamps, the ends of the separator flanges beyond the wrapping rods being clamped between said brackets and clamps.

11. In apparatus for separating dust from gas, a housing, a plurality of substantially vertical separator frames spaced from each other in the housing and pivoted at their ends adjacent the tops thereof, separators on the frames but unattached thereto, and means for sealing the spaces between adjacent separators and between the ends of the separators and the housing.

12. In apparatus for separating dust from gas, a housing, a plurality of substantially vertical separator frames spaced from each other in the housing and pivoted at their ends adjacent the tops thereof, separators on the frames but unattached thereto, said separators being bag shaped with open tops, flanges on the separators adjacent the top, the flanges sealing the spaces between adjacent separators and between the ends of the separators and the housing.

13. Apparatus for separating dust from gas, comprising a housing, a plurality of substantially vertical metal frames spaced from each other in the housing and pivoted adjacent their upper ends, openwork cross members reinforcing the frames, separators having open tops assembled on the frames, flanges adjacent the tops of the separators, the flanges of adjacent separators being wrapped together to form seals between adjacent separators and between the ends of the separators and the housing.

14. Apparatus for separating dust from gas, comprising a housing, a plurality of substantially vertical metal frames spaced from each other in the housing and pivoted adjacent their upper ends, openwork cross members reinforcing the frames, said frames being relatively long and wide but thin, bag shaped separators having a body portion conforming to the shape of the frames and open at the top, said separators being adapted to be drawn up around the frames from the bottoms thereof, flanges adjacent the tops of the separators, the flanges of adjacent separators being wrapped together to form seals between adjacent separators and between the ends of the separators and the housing.

15. Apparatus for separating dust from gas, comprising a housing, a plurality of substantially vertical frames spaced from each other in the housing and pivoted adjacent their upper ends, open top separators assembled on the frames with the tops of the separators below the tops of the frames so as to provide free spaces at the sides of the top portion of the frames unobstructed by the separators for the escape of cleaned gas from the space within the separators, flanges adjacent the tops of the separators, the flanges forming seals between adjacent separators and between the ends of the separators and the housing.

16. Apparatus for separating dust from gas, comprising a housing, a plurality of substantially vertical frames spaced from each other in the housing, open top separators assembled on the frames with the tops of the separators below the tops of the frames so as to provide free spaces at the sides of the top portions of the frames unobstructed by the separators for the escape of cleaned gas from the space within the separators, flanges adjacent the tops of the separators, the flanges forming seals between adjacent separators and between the ends of the separators and the housing.

17. In apparatus for separating dust from gas, a substantially vertical separator frame, wires wound around the frame from top to bottom and tied adjacent the top, a separator having an open top supported on the frame with the top of the separator below the top of the frame, whereby the wires may be tightened without removing the separators from the frames.

18. Apparatus for separating dust from gas, comprising a housing, a plurality of substantially vertical separator frames in the housing and pivotally supported adjacent their upper ends, separators on the frames, rods secured adjacent the bottoms of the separators, a shaker frame, resilient connections between the rods and shaker frame, and means for moving the shaker frame.

19. Apparatus for separating dust from gas, comprising a housing, a plurality of substantially vertical separator frames in the housing and pivotally supported adjacent their upper ends, separators on the frames, rods secured adjacent the bottoms of the separators, a shaker frame, resilient connections between the rods and shaker frame, means for moving the shaker frame, and a flexible connection between the shaker frame and housing.

20. Apparatus for separating dust from gas, comprising a housing, a plurality of substantially vertical separator frames in the housing and pivotally supported adjacent their upper ends, separators on the frames, a shaker frame, resilient connections between the bottom of the separators and the shaker frame, and means for moving the shaker frame.

21. Apparatus for separating dust from gas, comprising a housing, a plurality of substantially vertical separator frames in the housing and pivotally supported adjacent their upper ends, separators on the frames, a plurality of shaker frames below the separators and extending transversely thereto, resilient connections between each of the shaker frames and the bottoms of the separators, and means for bumping the shaker frames to discharge dust from the separators.

22. Apparatus for separating dust from gas, comprising a housing, a plurality of substantially vertical separator frames in the housing and pivotally supported adjacent their upper ends, separators on the frames, rods secured adjacent the bottoms of the separators, a plurality of shaker frames below the separators and extending transversely thereto, resilient connections between each of the shaker frames and said rods, and means for bumping the shaker frames to dislodge dust from the separators.

23. Apparatus for separating dust from gas, comprising a housing, a plurality of substantially vertical separator frames in the housing and pivotally supported adjacent their upper ends, separators on the frames, a plurality of shaker frames below the separators and extending transversely thereto, resilient connections between each of the shaker frames and the bottoms of the separators, a flexible connection between each of the shaker frames and the housing, and means for bumping the shaker frames to dislodge dust from the separators.

24. Apparatus for separating dust from gas, comprising a housing, a plurality of substantially vertical separator frames in the housing and pivotally supported adjacent their upper ends, separators on the frames, a plurality of shaker frames below the separators and extending transversely thereto, resilient connections between each of the shaker frames and the bottoms of the separators, and means for moving the shaker frames in opposite directions to dislodge dust from the separators.

25. In apparatus for separating dust from gas, a separator mounted on a pivoted swinging frame, means for swinging the frame, and swinging means for beating the separator as the separator swings.

26. In apparatus for separating dust from gas, a separator mounted on a pivoted frame, and means suspended from the separator for beating it as it moves.

27. In apparatus for separating dust from gas, a separator mounted on a pivoted frame, and a beater rod suspended from the separator for beating it as it moves.

28. In apparatus for separating dust from gas, a separator mounted on a pivoted frame, and a beater rod suspended by straps from the separator for beating it as it moves.

29. In apparatus for separating dust from gas, a separator mounted on a pivoted frame, and a beater rod suspended by straps from the separator for beating it as it moves, the straps being of different lengths.

30. In apparatus for separating dust from gas, a separator mounted on a pivoted frame, beater rods suspended by straps from the separator for beating it as it swings, the length of the straps decreasing from the top to the bottom of the separator.

31. In apparatus for separating dust from gas, a separator mounted on a pivoted frame, beater rods suspended by straps from the separator for beating it as it swings, and beating elements secured to the beating rods.

32. In apparatus for separating dust from gas, a separator mounted on a pivoted frame, beater rods suspended by straps from the separator for beating it as it swings, and wire loops secured to the beating rods.

33. In apparatus for separating dust from gas, a separator mounted on a pivoted frame, beater rods suspended by straps from the separator for beating it as it swings, and wire loops secured to the beating rods, the loops being unsymmetrical.

HAROLD E. McCRERY.